US007487335B1

(12) United States Patent
Chaudhry et al.

(10) Patent No.: US 7,487,335 B1
(45) Date of Patent: Feb. 3, 2009

(54) METHOD AND APPARATUS FOR ACCESSING REGISTERS DURING DEFERRED EXECUTION

(75) Inventors: Shailender Chaudhry, San Francisco, CA (US); Syed I. Haq, Sunnyvale, CA (US); Mohammed M. Rahman, San Jose, CA (US); Khanh Luu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 36 days.

(21) Appl. No.: 11/251,427

(22) Filed: Oct. 14, 2005

Related U.S. Application Data

(63) Continuation-in-part of application No. 10/686,061, filed on Oct. 14, 2003, now Pat. No. 7,114,060.

(51) Int. Cl.
*G06F 9/00* (2006.01)
(52) U.S. Cl. .................. 712/214; 712/218; 712/228
(58) Field of Classification Search ............... 712/214, 712/218, 228
See application file for complete search history.

(56) References Cited

U.S. PATENT DOCUMENTS

| 5,251,306 A | | 10/1993 | Tran | 395/375 |
|---|---|---|---|---|
| 5,535,346 A | * | 7/1996 | Thomas, Jr. | 712/217 |

(Continued)

FOREIGN PATENT DOCUMENTS

EP 0 357 188 3/1990

OTHER PUBLICATIONS

Garzaran, M.J. Prvulovic, M. Llaberia, J.M. Vinals, V. Rauchwerger, L. Torrellas, J., "Tradeoffs in buffering memory state for thread-level speculation in multiprocessors," High-Performance Computer Architecture, 2003. HPCA-9 2003. Proceedings. The Ninth International Symposium on; Publication Date: Feb. 8-12, 2003 On pp. 191-202.*

(Continued)

*Primary Examiner*—Eddie P Chan
*Assistant Examiner*—Keith Vicary
(74) *Attorney, Agent, or Firm*—Park, Vaughan & Fleming LLP

(57) ABSTRACT

One embodiment of the present invention provides a system that facilitates deferring execution of instructions with unresolved data dependencies as they are issued for execution in program order. During a normal-execution mode, the system issues instructions for execution in program order. Upon encountering an unresolved data dependency during execution of an instruction, the system generates a checkpoint, which includes a checkpointed version of the register file. Next, the system defers the instruction, which involves storing the instruction along with any resolved source operands for the instruction into a deferred buffer. The system then executes subsequent instructions in an execute-ahead mode which operates on a future version of the register file, wherein instructions that cannot be executed because of unresolved data dependencies are deferred, and wherein other non-deferred instructions are executed in program order. If the unresolved data dependency is resolved during the execute-ahead mode, the system executes deferred instructions in a deferred mode, which operates on a deferred version of the register file, wherein deferred instructions which can be executed are executed in program order, and wherein other deferred instructions that still cannot be executed because of unresolved data dependencies are deferred again.

21 Claims, 9 Drawing Sheets

U.S. PATENT DOCUMENTS

| | | | | |
|---|---|---|---|---|
| 5,751,985 | A | | 5/1998 | Shen et al. ................. 395/394 |
| 5,872,951 | A | * | 2/1999 | Tran ............................ 712/218 |
| 6,012,141 | A | * | 1/2000 | Isaman ........................ 712/244 |
| 6,385,715 | B1 | * | 5/2002 | Merchant et al. ............ 712/219 |
| 6,587,941 | B1 | * | 7/2003 | Flacks et al. ................ 712/218 |
| 6,609,190 | B1 | * | 8/2003 | Kahle et al. ................. 712/214 |
| 6,665,792 | B1 | * | 12/2003 | Merchant et al. ............ 712/219 |
| 2001/0029590 | A1 | | 10/2001 | Sager et al. ................. 713/501 |

OTHER PUBLICATIONS

James Dundas and Trevor Mudge, "Improving Data Cache Performance by Pre-Executing Instructions Under a Cache Miss," 11th ACM International Conference on Supercomputing, Jul. 1997.*

Publication entitled "A Low-Complexity Issue Logic", by Ramon Canal et al., ICS 2000, Santa Fe, New Mexico, USA, XP-001151623, pp. 327-335.

IBM Technical Disclosure Bulletin entitled "Deferred decodeing", vol. 27, No. 10B, Mar. 1985 IBM Corp., pp. 6257-6258, XP-000885126.

Publication entitled "Runahead Execution: An Alternative to Very Large Instruction Windows for Out-of-order Processors", by Onur Mutlu et al., Proceedings of The Ninth International Symposium on High-Performance computer Architeture, IEEE, 2002.

Publication entitled "Beating in-order Stalls with "Flea-Flicker" two-pass Pipelining", by Ronald D. Barnes et al., Proceedings of the 36th International Symposium on Microarchitecture, IEEE, 2003.

* cited by examiner

METHOD AND APPARATUS FOR ACCESSING REGISTERS DURING DEFERRED EXECUTION

RELATED APPLICATION

This application is a continuation-in-part of U.S. patent application Ser. No. 10/686,061, filed 14 Oct. 2003 now U.S. Pat. No. 7,114,060 entitled, "Selectively Deferring the Execution of Instructions with Unresolved Data Dependencies as They Are Issued in Program Order". This application hereby claims priority under 35 U.S.C. §120 to the above-listed parent patent application.

BACKGROUND

1. Field of the Invention

The present invention relates to techniques for improving computer system performance. More specifically, the present invention relates to a method and an apparatus for accessing registers while executing instructions in a deferred-execution mode.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers which are available for register renaming purposes during out-of-order execution also limits the effective size of the issue queue.

Some processor designers have proposed entering a "scout mode" during processor stall conditions. In scout mode, instructions are speculatively executed to prefetch future loads, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. This solution to the latency problem eliminates the complexity of the issue queue and the rename unit, and also achieves memory-level parallelism. However, it suffers from the disadvantage of having to re-compute results of computational operations that were performed in scout mode.

Hence, what is needed is a method and an apparatus for hiding memory latency without the above-described drawbacks of existing processor designs.

SUMMARY

One embodiment of the present invention provides a system that facilitates deferring execution of instructions with unresolved data dependencies as they are issued for execution in program order. During a normal-execution mode, the system issues instructions for execution in program order. Upon encountering an unresolved data dependency during execution of an instruction, the system generates a checkpoint, which includes a checkpointed version of the register file. Next, the system defers the instruction, which involves storing the instruction along with any resolved source operands for the instruction into a deferred buffer. The system then executes subsequent instructions in an execute-ahead mode which operates on a future version of the register file, wherein instructions that cannot be executed because of unresolved data dependencies are deferred, and wherein other non-deferred instructions are executed in program order. If the unresolved data dependency is resolved during the execute-ahead mode, the system executes deferred instructions in a deferred mode, which operates on a deferred version of the register file, wherein deferred instructions which can be executed are executed in program order, and wherein other deferred instructions that still cannot be executed because of unresolved data dependencies are deferred again.

In a variation on this embodiment, executing a deferred instruction in deferred mode involves obtaining resolved source operands from the deferred buffer, and obtaining other source operands, which are not available in the deferred buffer, from the deferred version of the register file. Moreover, if the deferred instruction writes to a destination register, the system writes to corresponding destination registers in both the future version and the deferred version of the register file, unless the corresponding destination register in the future version has been overwritten during execute ahead-mode and is no longer subject to an unresolved data dependency, in which case the future version of the register file is not written to.

In a further variation, the system maintains a "not-there" bit for each register in the future version of the register file, wherein the not-there bit indicates whether or not a value to be stored in a corresponding register by a preceding instruction is subject to an unresolved data dependency and is consequently not available. Furthermore, while executing an instruction during the execute-ahead mode, the not-there bit of a destination register is set if a value to be stored in the destination register is "not-ready," or if any source operand of the instruction is not-there.

In a variation on this embodiment, the deferred version of the register file is stored in an "active" register file, which holds a single current register window and is a multi-ported to support multiple simultaneous read/write operations. In this variation, the checkpointed version of the register file and the future version of the register file are stored in a single-ported SRAM, which has the capacity to hold multiple register windows, but which only supports one read/write operation at a time.

In a further variation, writing to a register in the active register file also involves writing to a copy of the register in the SRAM. In this variation, a register-window save operation involves incrementing a current-window pointer. Additionally, a register-window restore operation involves decrementing the current-window pointer and copying the current register window from the SRAM to the active register file.

In a further variation, when a register-window restore instruction is executed, preceding instructions in the pipeline are allowed to write to a previous window in the SRAM without writing to the active register file, thereby eliminating the need to drain the pipeline during execution of the restore instruction.

In a further variation, if data returns from a long-latency operation that caused the checkpoint, the method further comprises writing the returned data to a destination register in the checkpointed version of the register file without also writing the data the future version of the register file.

In a variation on this embodiment, if a save operation is followed by a restore operation during execute-ahead mode, a potential hazard condition arises because the save and restore operations are not deferred and a deferred store which occurs between the save and restore operations may be replayed during deferred mode without the surrounding save and restore operations. If this happens, the system throws away the contents of the future version of the register file and restarts execution from the instruction that caused the processor to enter execute-ahead mode.

In a variation on this embodiment, if all deferred instructions are successfully executed in the deferred mode, the system commits changes made during execute-ahead mode and deferred mode to the architectural state of processor. This involves copying the future version of the register file into an architectural version of the register file. The system then returns to normal-execution mode to resume normal program execution from the point where the execute-ahead mode left off.

In a variation on this embodiment, if a non-data-dependent stall condition is encountered while executing in normal-execution mode or execute-ahead mode, the system generates a checkpoint if the non-data-dependent stall condition was encountered during normal-execution mode. The system then moves to a scout mode which operates on the future version of the register file, wherein instructions are speculatively executed to prefetch future loads, but wherein results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal-execution mode from the launch point instruction (the instruction that originally encountered the launch point stall condition).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Processor

Figure 1:
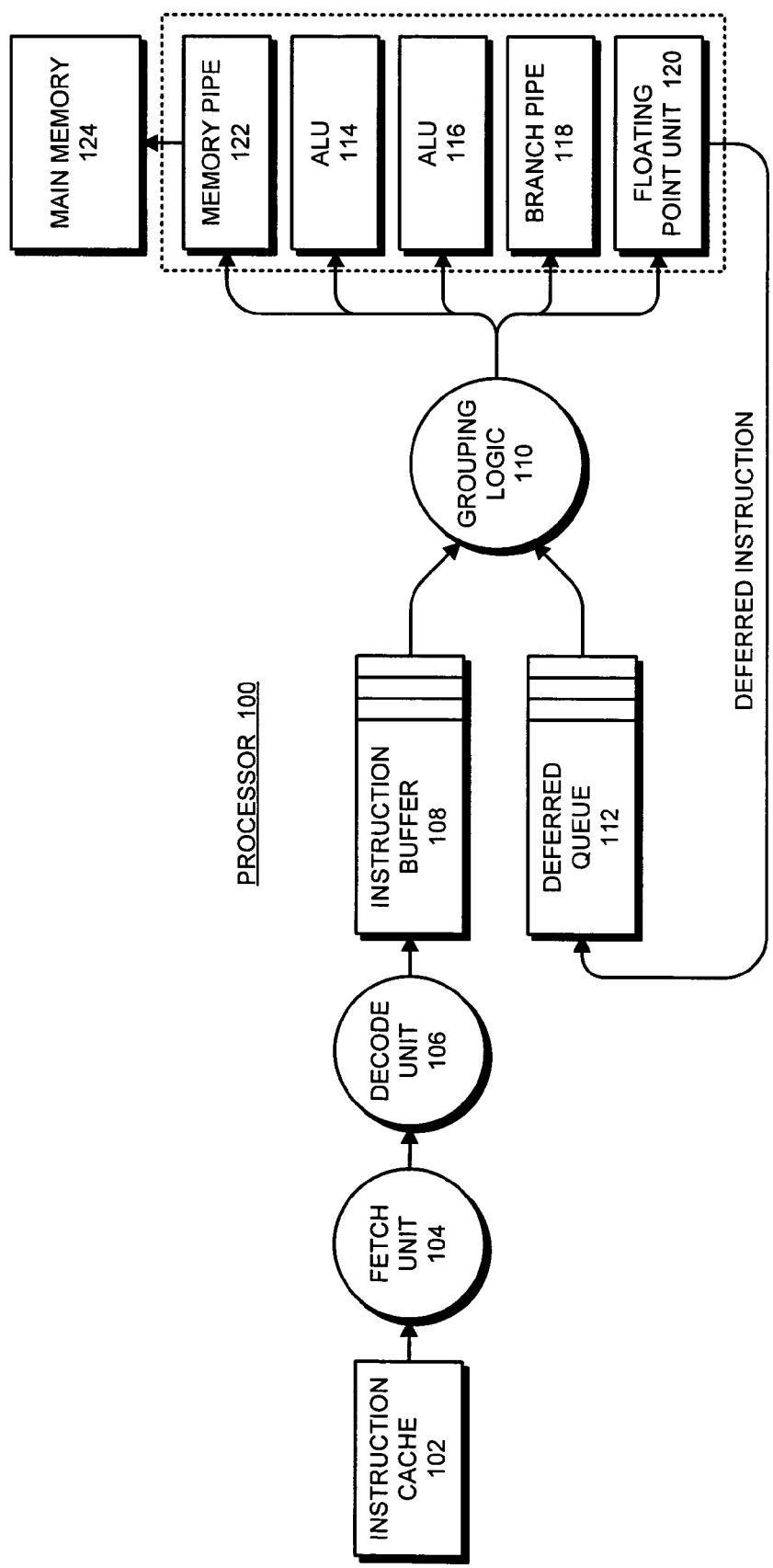
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120 and memory pipe 122.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 5.

Buffers

Figure 2:
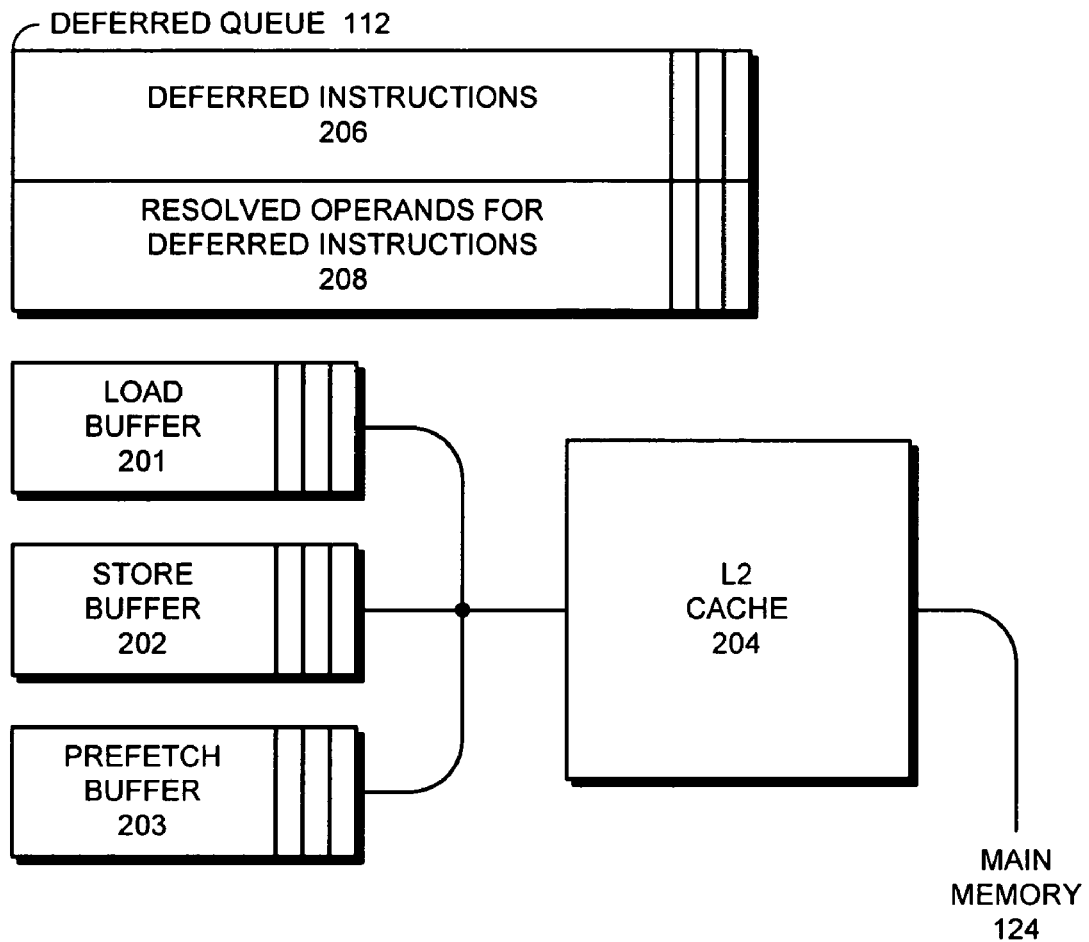
FIG. 2 illustrates various buffers within a processor in accordance with an embodiment of the present invention.

FIG. 2 illustrates various buffers and other structures within processor 100 in accordance with an embodiment of the present invention. These buffers and other structures include load buffer 201, store buffer 202, prefetch buffer 203 and L2 cache 204. All of these are well-known structures in existing processors. Load buffer 201, store buffer 202 and prefetch buffer 203 hold entries for load, store and prefetch instructions that are waiting to access slower portions of the memory hierarchy, such as L2 cache 204 and possibly main memory 124.

Also illustrated in FIG. 2 is deferred queue 112 (which also appears in FIG. 1). As was described above, deferred queue 112 stores deferred instructions 206, which are waiting for unresolved data dependencies to be resolved. In addition to storing deferred instructions, deferred queue 112 also stores corresponding operands 208 that have been resolved for the deferred instructions. When the deferred instructions 206 are finally executed in deferred mode, these deferred instructions 206 use the resolved source operands 208 from deferred queue 112, if such resolved operands were previously stored along with the instructions in the deferred queue 112. In this way, instructions following the deferred instructions that overwrite the resolved source operands will not create WAR hazards, because the deferred instructions will use the previously stored resolved operands 208 for the deferred instructions from deferred queue 112. This process is described in more detail below.

Keeping Track of Dependencies

The present invention keeps track of data dependencies in order to determine if an instruction is subject to an unresolved data dependency. In one embodiment of the present invention, this involves maintaining state information for each register, which indicates whether or not a value in the register depends on an unresolved data dependency.

Figure 3:
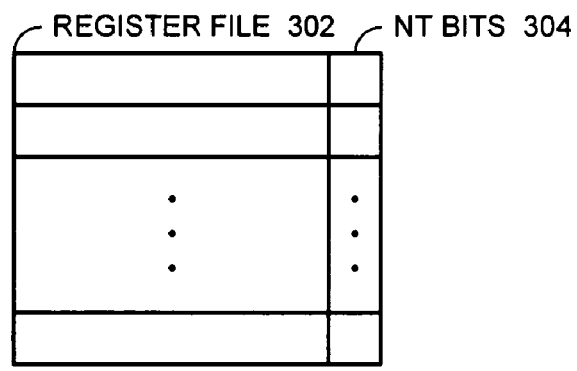
FIG. 3 illustrates a register file in accordance with an embodiment of the present invention.

For example, FIG. 3 illustrates a register file 302 in accordance with an embodiment of the present invention. Each register in register file 302 is associated with a "not-there" (NT) bit 304. During execute-ahead mode, the not-there bit keeps track of whether a valid operand value is contained in the register, or if the operand cannot be produced because of an unresolved data dependency. For example, if an instruction is waiting for a source operand to be produced by a load miss, the instruction is deferred and the not-there bit of the instruction's destination register is set to indicate that the desired result is not present in the destination register.

When a subsequent instruction references a source operand value that is marked as not-there, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 4:
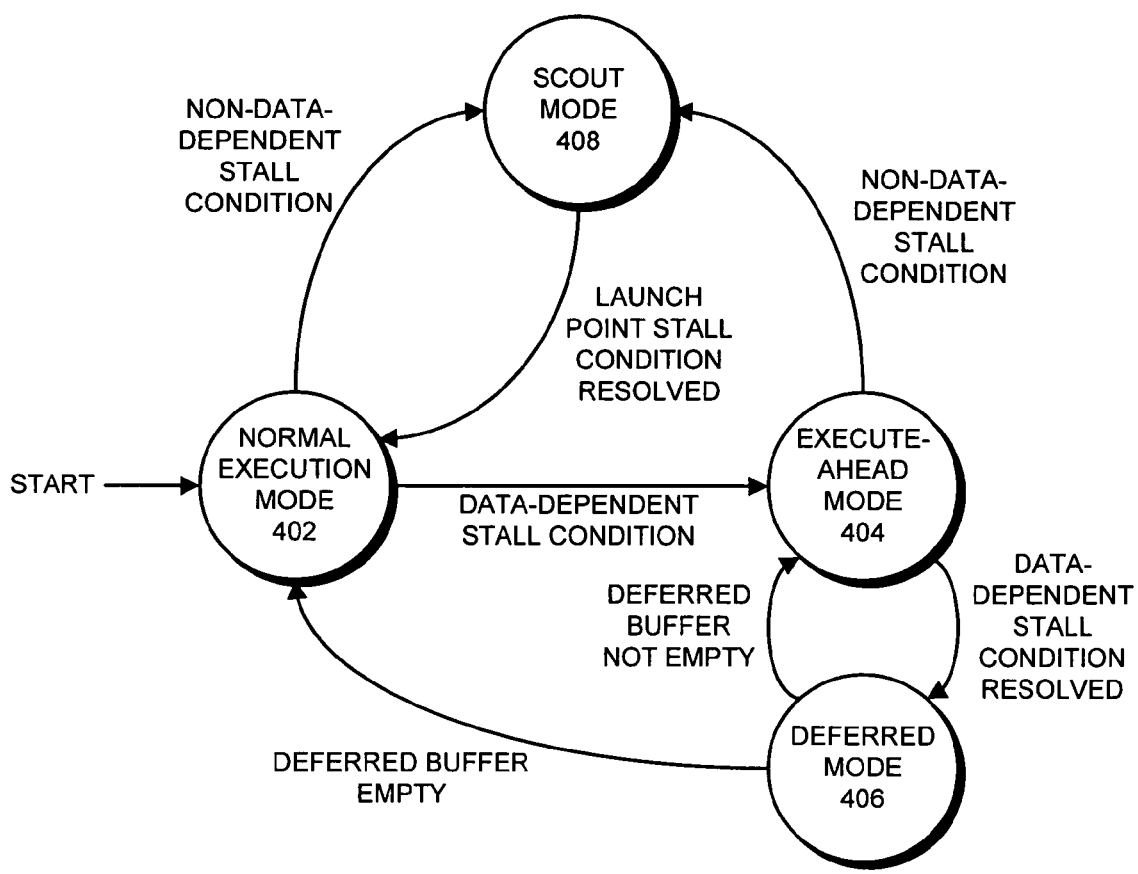
FIG. 4 presents a state diagram, which includes execute-ahead mode and scout mode, in accordance with an embodiment of the present invention.

FIG. 4 presents a state diagram which includes execute-ahead mode 404, deferred mode 406 and the scout mode 408 in accordance with an embodiment of the present invention. The system starts in normal execution mode 402, wherein instructions are executed in program order as they are issued from instruction buffer 108 (see FIG. 1).

Next, if an unresolved data dependency arises during execution of an instruction, the system moves to execute-ahead mode 404. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 404, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 404 or deferred mode 406.) The system also "defers" execution of the instruction that encountered the unresolved data dependency by storing the instruction in deferred queue 112.

While operating in execute-ahead mode 404, the system continues to execute instructions in program order as they are received from instruction buffer 108; any instructions that cannot execute because of an unresolved data dependency are deferred into deferred queue 112.

During execute-ahead mode 404, if an unresolved data dependency is finally resolved, the system moves into deferred mode 406, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112. On the other hand, the system executes other instructions that can be executed in program order with respect to each other.

After the system completes a pass through deferred queue 112, if deferred queue 112 is empty, the system moves back into normal execution mode 402. This may involve committing changes made during execute-ahead mode 404 and deferred mode 406 to the architectural state of processor 100, if such changes have not been already committed. It can also involve throwing away the checkpoint generated when the system moved into execute-ahead mode 404.

On the other hand, if deferred queue 112 is not empty after the system completes a pass through deferred queue 112, the system returns to execute-ahead mode 404 to execute instructions from instruction buffer 108 from the point where the execute-ahead mode 404 left off.

If a non-data dependent stall condition arises while the system is in normal execution mode 402 or in execute-ahead mode 404, the system moves into scout mode 408. (This non-data-dependent stall condition can include a memory barrier operation, or a deferred queue full condition.) In scout mode 408, instructions are speculatively executed to prefetch future memory operations, but results are not committed to the architectural state of processor 100.

Scout mode 408 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 408.

Unfortunately, computational operations performed during scout mode 408 need to be recomputed again, which can require a large amount of computational work.

When the original "launch point" stall condition is finally resolved, the system moves back into normal execution mode 402, and, in doing so, uses the previously generated checkpoint to resume execution from the launch point instruction that encountered the launch point stall condition. The launch point stall condition is the stall condition that originally caused the system to move out of normal execution mode 402. For example, the launch point stall condition can be the data-dependent stall condition that caused the system to move from normal execution mode 402 to execute-ahead mode 404, before moving to scout mode 408. Alternatively, the launch point stall condition can be the non-data-dependent stall condition that caused the system to move directly from normal execution mode 402 to scout mode 408.

Processing an Instruction in Execute-Ahead Mode

Figure 5:
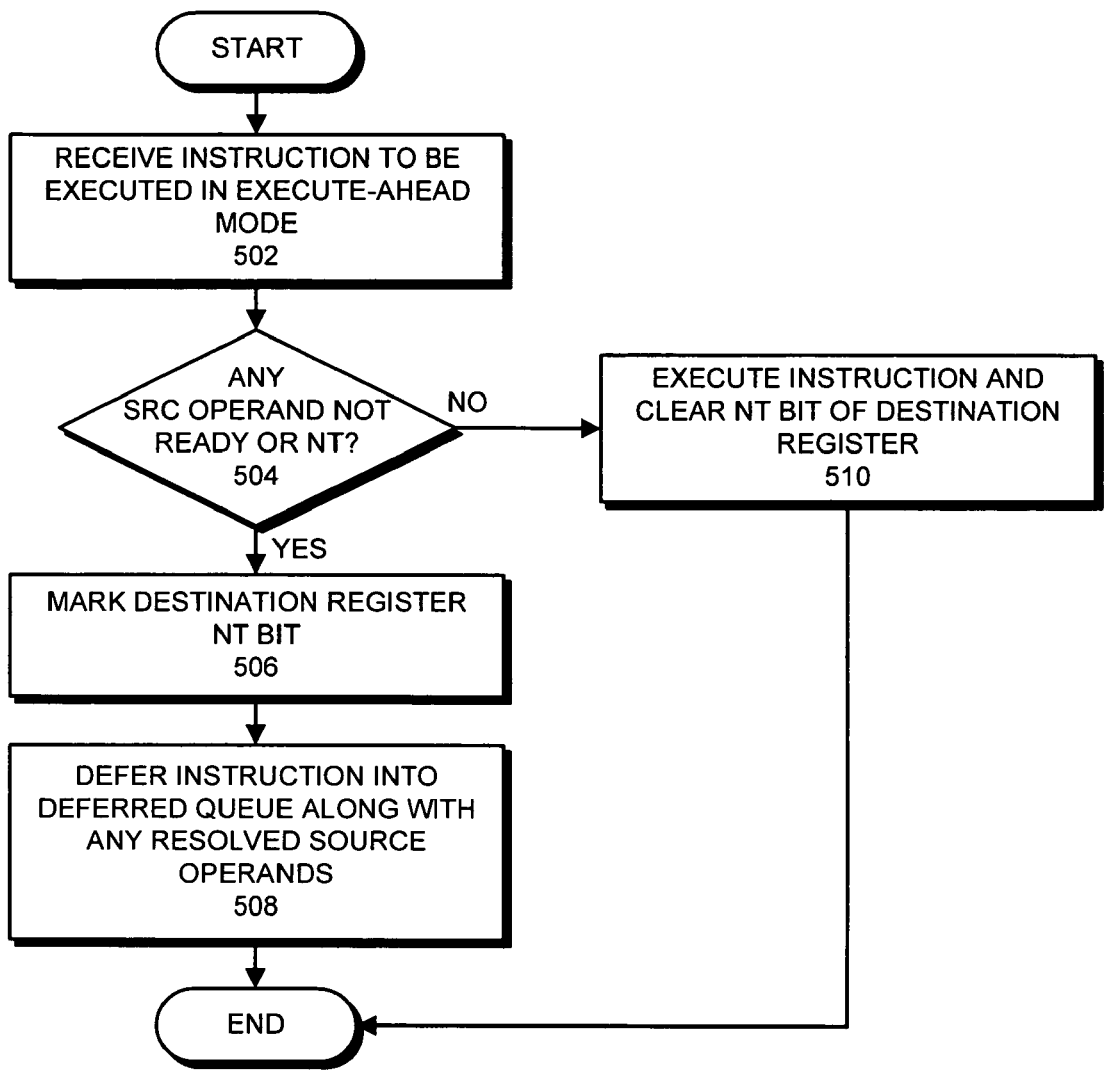
FIG. 5 presents a flow chart illustrating how an instruction is processed in execute-ahead mode in accordance with an embodiment of the present invention.

FIG. 5 presents a flow chart illustrating how an instruction is processed in execute-ahead mode in accordance with an embodiment of the present invention. The process starts when the system receives an instruction to be executed during execute-ahead mode (step 502).

Next, the system determines if any source operand for the instruction is "not ready" or is "not there" (step 504). A source operand is "not ready" if a memory reference has not returned a value for the source operand. For example, a source operand is not-ready if the operand has not returned from: a preceding load miss, a preceding translation lookaside buffer (TLB) miss, or a preceding full or partial read-after-write (RAW) from store buffer operation. A source operand is "not there" if the not-there bit of a register containing the source operand is set.

If any source operand for the instruction is not ready or is not there, the system marks the NT bit of the destination register for the instruction (step 506) and defers the instruction by placing the instruction in the deferred queue 112. Note that the instruction is placed into the deferred queue along with any source operands for the instruction which are resolved (step 508). This prevents WAR hazards as is described in more detail below.

On the other hand, if all source operands for the instruction are available, the system executes the instruction, and writes a result (if there is one) to the destination register. The system also clears the NT bit of the destination register to indicate that the value in the destination register has been resolved (step 510).

Processing an Instruction in Deferred Mode

Figure 6:
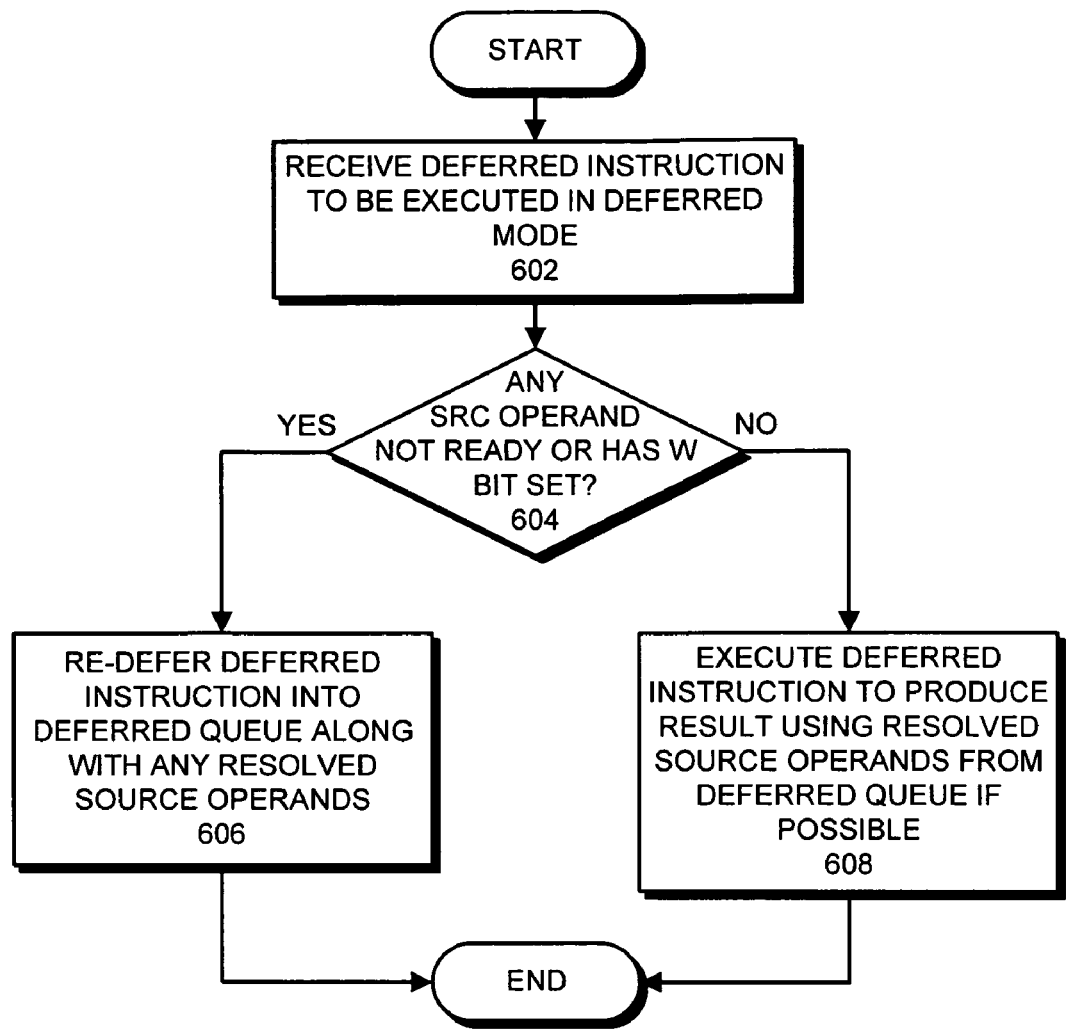
FIG. 6 presents a flow chart illustrating how an instruction is processed in deferred mode in accordance with an embodiment of the present invention.

FIG. 6 presents a flow chart illustrating how an instruction is processed in deferred mode in accordance with an embodiment of the present invention. The process starts when the system receives a deferred instruction to be executed during deferred mode (step 602).

Next, the system determines if any source operand for the deferred instruction is "not ready" (step 604). If so, the system re-defers the instruction by placing the instruction in the deferred queue 112 along with any resolved source operands (to prevent WAR hazards) (step 606).

On the other hand, if all source operands for the deferred instruction are available, the system executes the deferred instruction using any resolved source operands that are available from the deferred queue (step 608). This avoids a WAR hazard because after a resolved operand is written into the deferred queue along with a deferred instruction, the architectural register containing the resolved operand can be overwritten by an instruction which follows the deferred instructed in program order but which is executed before the deferred instruction. This overwriting of the architectural register by a following instruction does not affect the source operand in the deferred queue, which is subsequently used by the deferred instruction.

Register File Versions

Figure 7:
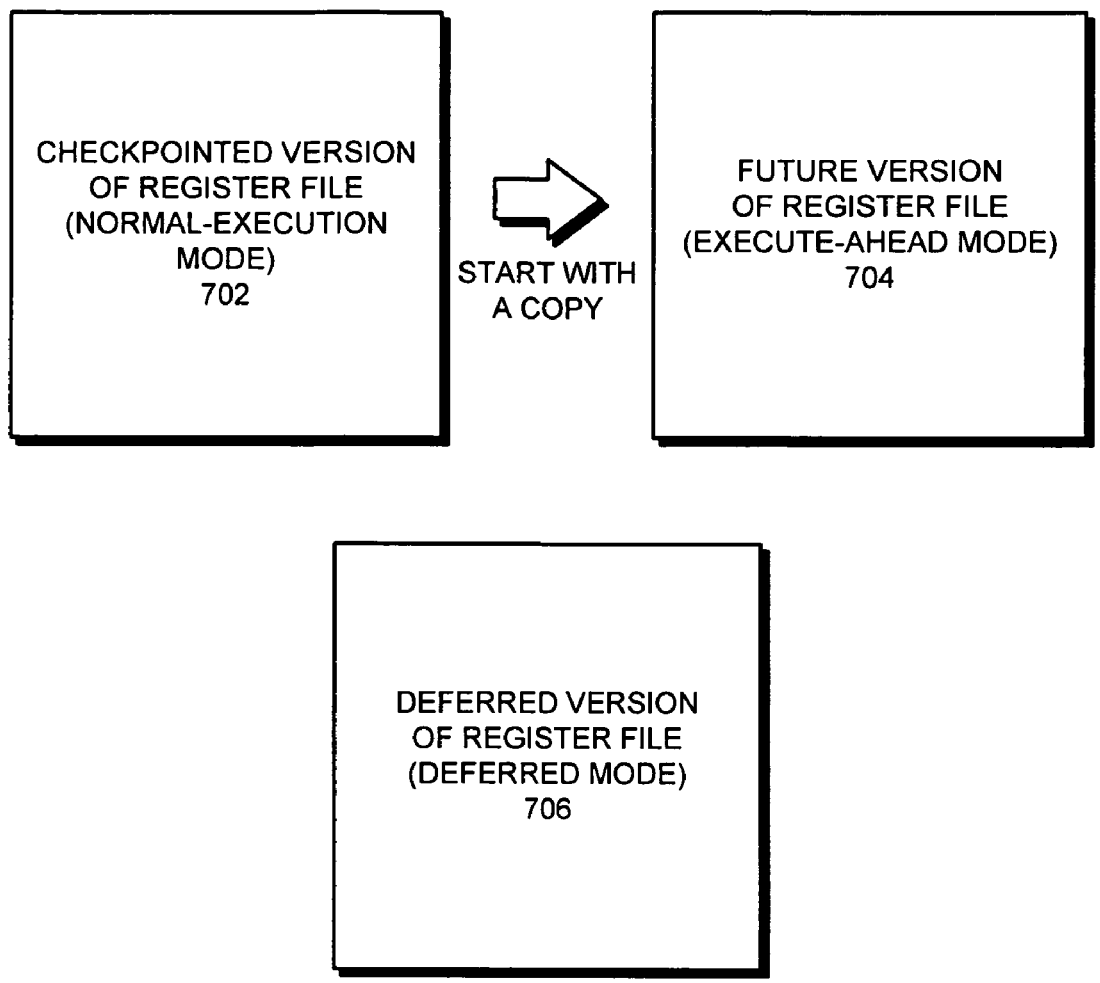
FIG. 7 illustrates three different versions of a register file in accordance with an embodiment of the present invention.

FIG. 7 illustrates three different versions of a register file in accordance with an embodiment of the present invention. A "checkpointed" version of the register file 702 contains the checkpointed state of the register file which was created when the system left normal-execution mode. In one embodiment of the present invention, during normal-execution mode the system operates on the checkpointed version of the register file 702. Hence, the checkpointed version of the register file 702 can alternatively be referred to as the "normal" version of the register file.

The "future" version of the register file 704 is operated on during execute-ahead mode (or scout mode). At the beginning of execute-ahead mode, the system starts by copying the checkpointed version of the register file 702 to the future version of the register file 704. The system then operates on the future version of the register file 704 during execute-ahead mode.

Finally, the "deferred" version of the register file 706 is operated on during deferred mode. As was described above, while executing an instruction in deferred mode, the system obtains previously resolved source operands from the deferred queue 112, while other, more-recently-resolved source operands are obtained from the deferred version of the register file 706.

Accessing Registers During Deferred Mode

While executing in deferred mode, the system obtains previously-resolved source operands from the deferred buffer. Recall that these previously-resolved source operands were stored into the deferred buffer along with the deferred instructions. The system obtains other source operands, which were not stored in the deferred buffer, from the deferred version of the register file 706.

Figure 8:
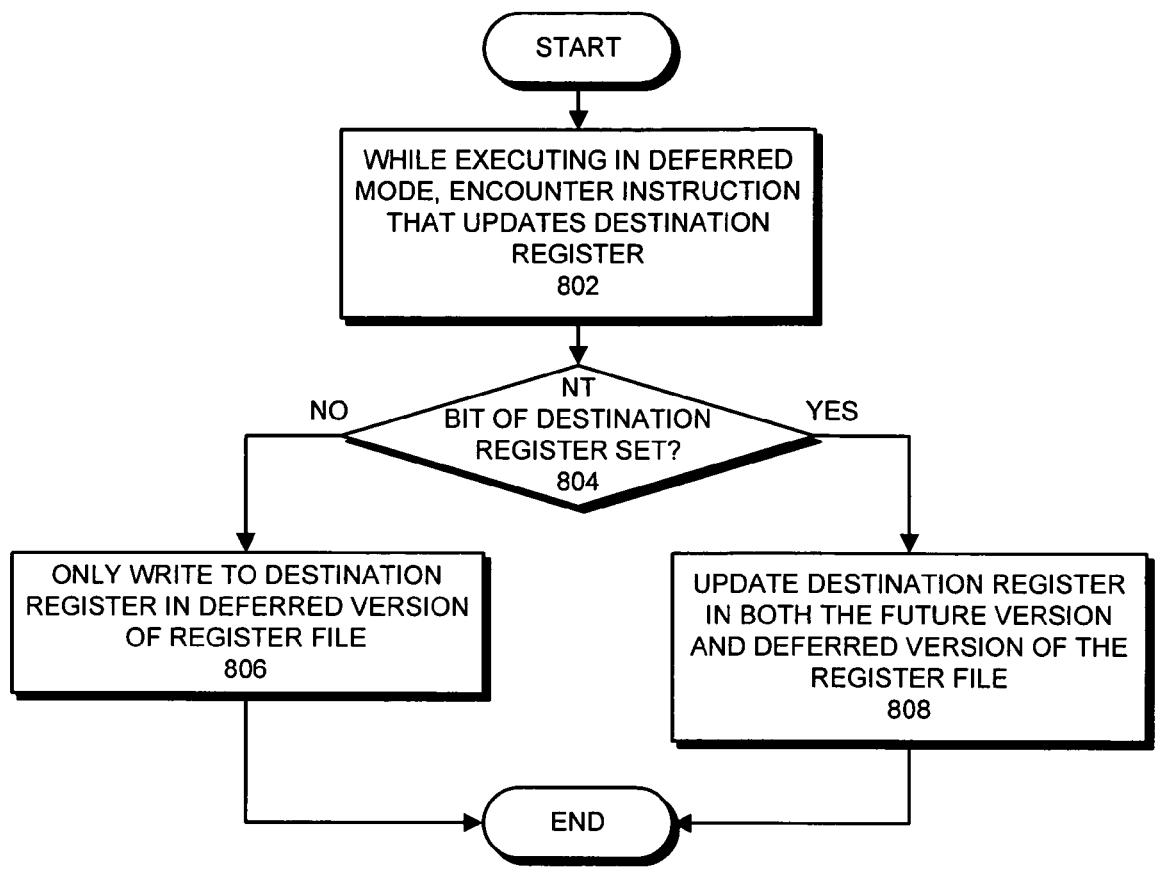
FIG. 8 presents a flow chart illustrating how the system updates the register files during deferred mode in accordance with an embodiment of the present invention.

While executing in deferred mode, the system updates destination registers as is illustrated by the flow chart in FIG. 8. Upon encountering a deferred instruction which updates a destination register (step 802), the system determines if the not-there bit of the destination register is set (step 804). If so, the system updates the destination register in both the future version of the register file 704 and the deferred version of the register file 706 (step 808).

Otherwise, if the not-there bit of the destination register is not set, an instruction following the deferred instruction in program order has already updated the destination register. In this case, allowing the deferred instruction to overwrite the destination register would cause a write-after-write (WAW) hazard. Hence, in order to prevent this WAW hazard, the system only updates the destination register in the deferred version of the register file 706, and does not update the future version of the register file (step 806).

Implementation in Register-Windowing System

Note that implementing three versions of the register file in hardware can require a large number of registers, especially in modern processors that provide hundreds of registers to support register-windowing. This problem can be somewhat alleviated through the following technique, which only maintains two copies of the entire register file.

Figure 9:
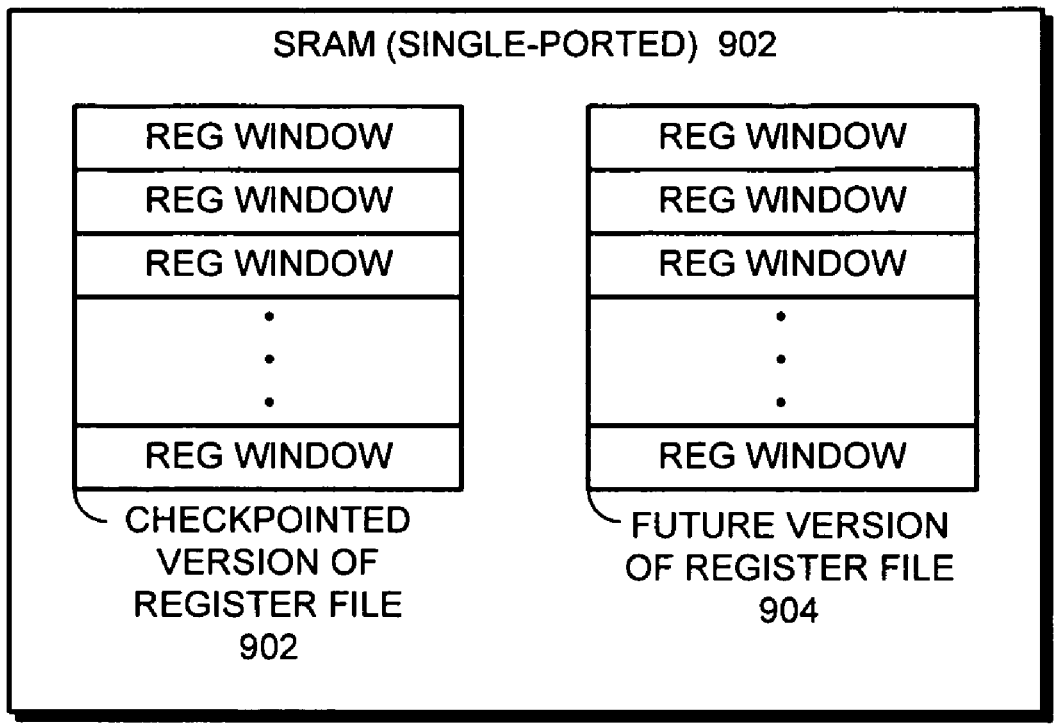
FIG. 9 illustrates how the three versions of the register file are stored in an active register file and an SRAM in accordance with an embodiment of the present invention.
Figure 9:
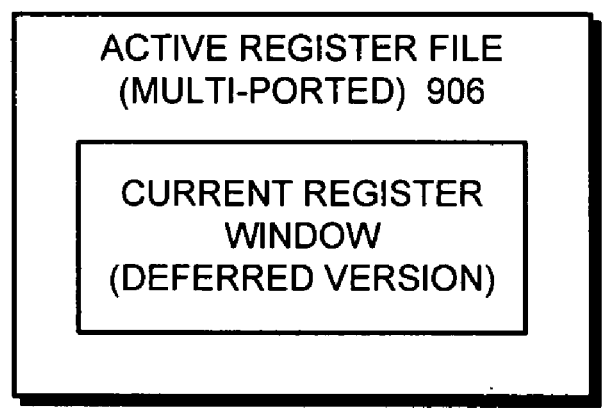

More specifically, FIG. 9 illustrates how the three versions of the register file are stored in an active register file 906 and a static random-access memory (SRAM) 902 in accordance with an embodiment of the present invention. Some existing processors that support register windowing provide an "active" register file, which holds only the current active register window and is multi-ported to support multiple simultaneous read/write operations. Other "inactive" register windows are stored in a static random-access memory (SRAM), which as the capacity to hold multiple register windows, but which only supports one read/write operation at a time.

One embodiment of the present invention uses the active register file 906 to store the deferred version of the register file 706, and uses the SRAM 902 to store both the checkpointed version of the register file 702 and the future version of the register file 704.

More specifically, during deferred mode, the system maintains only a single current register window 904 for the deferred version of register file 706 in active register file 906. The system does not maintain other register windows for the deferred version of the register file 706. In contrast, the system maintains all of the register windows for the checkpointed version of the register file 702, and all of the register windows for the entire future version of the register file 704 in SRAM 902.

Hazard Condition

A hazard condition can potentially arise when a register-window save operation is followed by a register-window restore operation during execute-ahead mode. Note that register window save and restore operations have no operands and will consequently never be deferred. This give rise to a hazard condition because a deferred store, which occurs between a save operation and a restore operation, may be replayed during deferred mode without the surrounding save and restore operations. A subsequent use of the destination register for the deferred store will pick up the value written by the deferred store. This is incorrect because restore operation changed the current register window after the deferred store was executed, and hence the destination register should contain a value from the restored register window, not from the deferred store.

Figure 10:
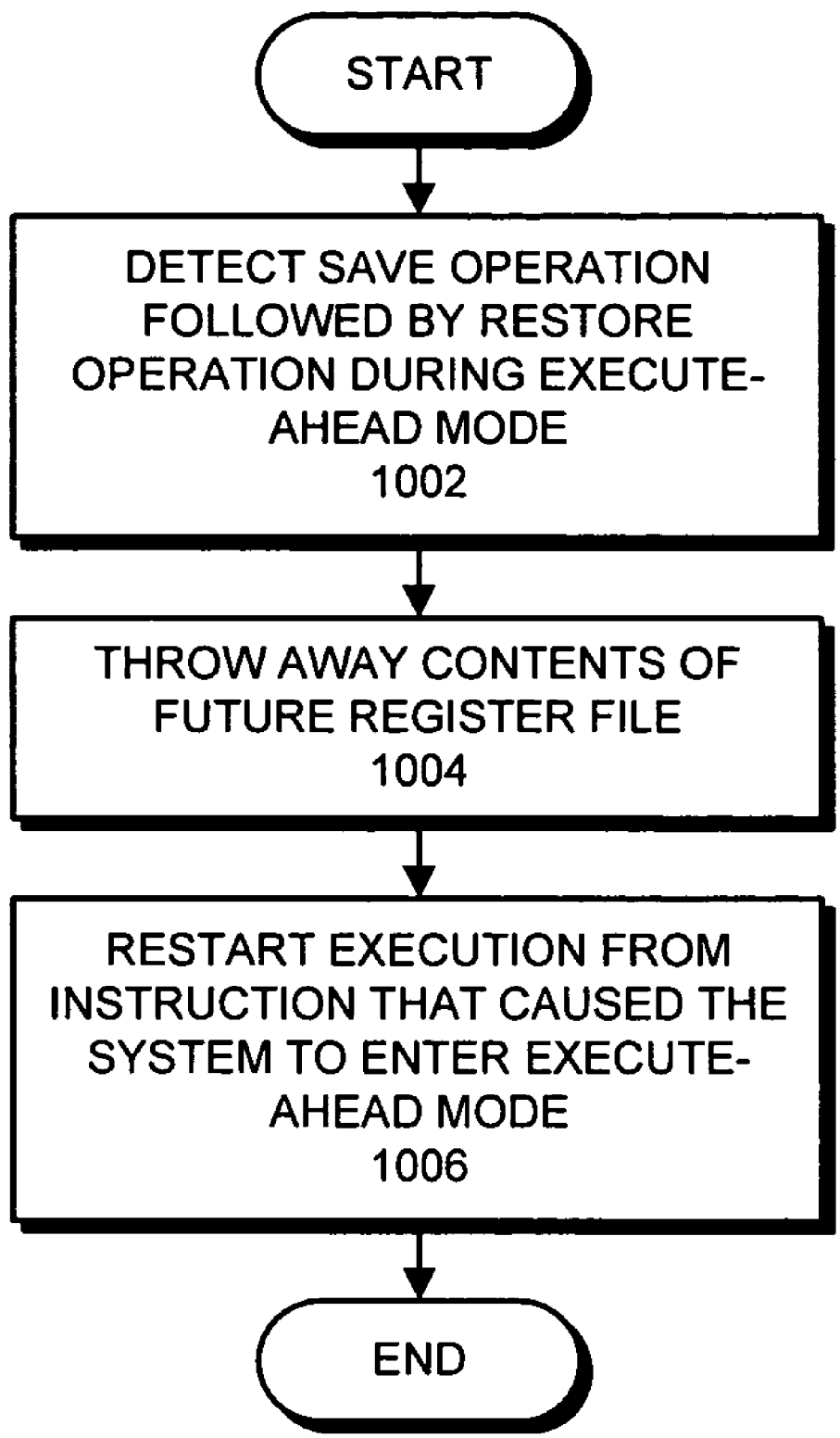
FIG. 10 presents a flow chart illustrating how a save operation followed by a restore operation during execute-ahead mode causes a hazard condition in accordance with an embodiment of the present invention.

One embodiment of the present invention deals with this problem through the operations illustrated in FIG. 10. During execute-ahead mode, the system detects a register-window save operation followed by a restore operation (step 1002). Upon detecting these operations, the system throws away the contents of the future version of the register file (step 1004) and restarts execution from the instruction that caused the processor to enter execute-ahead mode (step 1006).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing registers while executing instructions in a deferred-execution mode, comprising:

issuing instructions for execution in program order during a normal-execution mode;

upon encountering an unresolved data dependency during execution of an instruction, generating a checkpoint, which includes a checkpointed version of a register file, deferring the instruction, which involves storing the instruction along with any resolved source operands for the instruction into a deferred buffer, executing subsequent instructions in an execute-ahead mode which operates on a future version of the register file, wherein instructions that cannot be executed because of unresolved data dependencies are deferred, and wherein other non-deferred instructions are executed in program order; and if the unresolved data dependency is resolved during the execute-ahead mode, executing deferred instructions in a deferred mode, which operates on a deferred version of the register file, wherein deferred instructions which can be executed are executed in program order, and wherein other deferred instructions that still cannot be executed because of unresolved data dependencies are deferred again, and wherein if the deferred instruction writes to a destination register, executing the deferred instruction involves writing to corresponding destination registers in both the future version and the deferred version of the register file, unless the corresponding destination register in the future version has been overwritten during execute ahead-mode and is no longer subject to an unresolved data dependency, in which case the future version of the register file is not written to, otherwise, if the unresolved data dependency is not resolved during the execute-ahead mode, continuing operation in execute-ahead mode.

2. The method of claim 1, wherein executing a deferred instruction in deferred mode involves:

obtaining resolved source operands from the deferred buffer; and obtaining other source operands, which are not available in the deferred buffer, from the deferred version of the register file.

3. The method of claim 2, further comprising maintaining a "not-there" bit for each register in the future version of the register file, wherein a not-there bit indicates whether or not a value to be stored in the corresponding register by a preceding instruction is subject to an unresolved data dependency and is consequently not available; and wherein while executing an instruction during the execute-ahead mode, the not-there bit of a destination register is set if a value to be stored in the destination register is "not-ready," or if any source operand of the instruction is not-there.

4. The method of claim 1, wherein during operation in deferred mode, the deferred version of the register file is stored in an "active" register file, which holds a register window that is written to and read from during operation in deferred mode and is multi-ported to support multiple simultaneous read/write operations; and the checkpointed version of the register file and the future version of the register file are stored in a single-ported SRAM, which has the capacity to hold multiple register windows, but which only supports one read/write operation at a time.

5. The method of claim 4,
wherein writing to a register in the active register file also involves writing to a copy of the future version of the register in the SRAM;
wherein a register-window save operation involves incrementing a current-window pointer; and
wherein a register-window restore operation involves decrementing the current-window pointer and copying a corresponding register window from the SRAM to the active register file.

6. The method of claim 5, wherein when a register-window restore instruction is executed, preceding instructions in a pipeline write to a register within a corresponding register window in the SRAM without writing to the active register file, thereby eliminating the need to drain the pipeline during execution of the restore instruction.

7. The method of claim 5, wherein if data returns from a long-latency operation that caused the checkpoint, the method further comprises writing the returned data to a destination register in the checkpointed version of the register file without also writing the data to the future version of the register file.

8. The method of claim 1,
wherein if a register window save operation is followed by a register window restore operation during execute-ahead mode, a potential hazard condition arises because the register window save and register window restore operations are not deferred and a deferred store which would occur between the register window save and register window restore operations may be replayed during deferred mode without the surrounding register window save and register window restore operations; and
wherein if this potential hazard condition arises, the method further involves deleting the contents of the future version of the register file and restarting execution from the instruction that caused the processor to enter execute-ahead mode.

9. The method of claim 1, wherein if all deferred instructions are successfully executed in the deferred mode, the method further comprises:
committing changes made during execute-ahead mode and deferred mode to the architectural state of processor, which involves copying the future version of the register file into an architectural version of the register file; and
returning to normal-execution mode to resume normal program execution from the point where the execute-ahead mode left off.

10. The method of claim 1, wherein if a non-data-dependent stall condition is encountered while executing in normal-execution mode or execute-ahead mode, the method further comprises:
generating a checkpoint if the non-data-dependent stall condition was encountered during normal-execution mode;
moving to a scout mode which operates on the future version of the register file, wherein instructions are speculatively executed to prefetch future loads, but wherein results are not committed to the architectural state of the processor; and
when the unresolved data dependency or the non-data dependent stall condition that originally caused the system to move out of normal-execution mode is finally resolved, using the checkpoint to resume execution in normal-execution mode from the instruction that originally encountered the unresolved data dependency or the non-data dependent stall condition that caused the system to move out of normal-execution mode.

11. An apparatus that facilitates accessing registers while executing instructions in a deferred-execution mode, comprising:
an issuing mechanism configured to issue instructions for execution in program order during a normal-execution mode;
an execution mechanism, wherein upon encountering an unresolved data dependency during execution of an instruction, the execution mechanism is configured to,
generate a checkpoint, which includes a checkpointed version of a register file,
defer the instruction, which involves storing the instruction along with any resolved source operands for the instruction into a deferred buffer, and to
execute subsequent instructions in an execute-ahead mode which operates on a future version of the register file, wherein instructions that cannot be executed because of unresolved data dependencies are deferred, and wherein other non-deferred instructions are executed in program order; and
wherein if the unresolved data dependency is resolved during the execute-ahead mode, the execution mechanism is configured to execute deferred instructions in a deferred mode, which operates on a deferred version of the register file, wherein deferred instructions which can be executed are executed in program order, and wherein other deferred instructions that still cannot be executed because of unresolved data dependencies are deferred again, and wherein if the deferred instruction writes to a destination register, when executing the deferred instruction, the execution mechanism is configured to write to corresponding destination registers in both the future version and the deferred version of the register file, unless the corresponding destination register in the future version has been overwritten during execute ahead-mode and is no longer subject to an unresolved data dependency, in which case the execution mechanism is configured not to write to the future version of the register file,
otherwise, if the unresolved data dependency is not resolved during the execute-ahead mode, the execution mechanism is configured to continue operation in execute-ahead mode.

12. The apparatus of claim 11, wherein while executing a deferred instruction in deferred mode, the execution mechanism is configured to:
obtain resolved source operands from the deferred buffer; and to
obtain other source operands, which are not available in the deferred buffer, from the deferred version of the register file.

13. The apparatus of claim 12, wherein the execution mechanism is configured to maintain a "not-there" bit for each register in the future version of the register file, wherein a not-there bit indicates whether or not a value to be stored in the corresponding register by a preceding instruction is subject to an unresolved data dependency and is consequently not available; and
wherein while executing an instruction during the execute-ahead mode, the not-there bit of a destination register is set if a value to be stored in the destination register is "not-ready," or if any source operand of the instruction is not-there.

14. The apparatus of claim 11, wherein during operation in deferred mode,
the deferred version of the register file is stored in an "active" register file, which holds a register window that is written to and read from during operation in deferred mode and is multi-ported to support multiple simultaneous read/write operations; and
the checkpointed version of the register file and the future version of the register file are stored in a single-ported SRAM, which has the capacity to hold multiple register windows, but which only supports one read/write operation at a time.

15. The apparatus of claim 14,
wherein while updating a register in the active register file, the execution mechanism is configured to update a copy of the future version of the register in the SRAM;
wherein while executing a register-window save operation, the execution mechanism is configured to increment a current-window pointer; and
wherein while executing a register-window restore operation, the execution mechanism is configured to decrement the current-window pointer and to copy a corresponding register window from the SRAM to the active register file.

16. The apparatus of claim 15, wherein when a register-window restore instruction is executed, the execution mechanism is configured so that preceding instructions in a pipeline to write to a register within a corresponding register window in the SRAM without writing to the active register file, thereby eliminating the need to drain the pipeline during execution of the restore instruction.

17. The apparatus of claim 15, wherein if data returns from a long-latency operation that caused the checkpoint, the execution mechanism is configured to write the returned data to a destination register in the checkpointed version of the register file without also writing the data to the future version of the register file.

18. The apparatus of claim 11,
wherein if a register window save operation is followed by a register window restore operation during execute-ahead mode, a potential hazard condition arises because the register window save and register window restore operations are not deferred and a deferred store which would occur between the register window save and register window restore operations may be replayed during deferred mode without the surrounding register window save and register window restore operations; and
wherein if this potential hazard condition arises, the execution mechanism is configured to delete the contents of the future version of the register file and to restart execution from the instruction that caused the processor to enter execute-ahead mode.

19. The apparatus of claim 11, wherein if all deferred instructions are successfully executed in the deferred mode, the execution mechanism is configured to:
commit changes made during execute-ahead mode and deferred mode to the architectural state of processor, which involves copying the future version of the register file into an architectural version of the register file; and to
return to normal-execution mode to resume normal program execution from the point where the execute-ahead mode left off.

20. The apparatus of claim 11, wherein if a non-data-dependent stall condition is encountered while executing in normal-execution mode or execute-ahead mode, the execution mechanism is configured to:
generate a checkpoint if the non-data-dependent stall condition was encountered during normal-execution mode;
move to a scout mode which operates on the future version of the register file, wherein instructions are speculatively executed to prefetch future loads, but wherein results are not committed to the architectural state of the processor; and
when the unresolved data dependency or the non-data dependent stall condition that originally caused the system to move out of normal-execution mode is finally resolved, to use the checkpoint to resume execution in normal-execution mode from the instruction that originally encountered the unresolved data dependency or the non-data dependent stall condition that originally caused the system to move out of normal-execution mode.

21. A computer system that facilitates accessing registers while executing instructions in a deferred-execution mode, comprising:
a processor;
a memory;
an issuing mechanism within the processor configured to issue instructions for execution in program order during a normal-execution mode;
an execution mechanism within the processor, wherein upon encountering an unresolved data dependency during execution of an instruction, the execution mechanism is configured to,
generate a checkpoint, which includes a checkpointed version of a register file,
defer the instruction, which involves storing the instruction along with any resolved source operands for the instruction into a deferred buffer, and to
execute subsequent instructions in an execute-ahead mode which operates on a future version of the register file, wherein instructions that cannot be executed because of unresolved data dependencies are deferred, and wherein other non-deferred instructions are executed in program order; and
wherein if the unresolved data dependency is resolved during the execute-ahead mode, the execution mechanism is configured to execute deferred instructions in a deferred mode, which operates on a deferred version of the register file, wherein deferred instructions which can be executed are executed in program order, and wherein other deferred instructions that still cannot be executed because of unresolved data dependencies are deferred again, and wherein if the deferred instruction writes to a destination register, when executing the deferred instruction, the execution mechanism is configured to write to corresponding destination registers in both the future version and the deferred version of the register file, unless the corresponding destination register in the future version has been overwritten during execute ahead-mode and is no longer subject to an unresolved data dependency in which case the execution mechanism is configured not to write to the future version of the register file,
otherwise, if the unresolved data dependency is not resolved during the execute-ahead mode, the execution mechanism is configured to continue operation in execute-ahead mode.

* * * * *